(12) United States Patent
Takeshima et al.

(10) Patent No.: US 8,112,517 B2
(45) Date of Patent: Feb. 7, 2012

(54) RELAY SYSTEM, RELAY PROGRAM, AND RELAY METHOD

(75) Inventors: Yoshiteru Takeshima, Tokyo (JP); Kazuya Tsuruta, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 90 days.

(21) Appl. No.: 12/022,225

(22) Filed: Jan. 30, 2008

(65) Prior Publication Data

US 2008/0215723 A1    Sep. 4, 2008

(30) Foreign Application Priority Data

Jan. 30, 2007  (JP) .................................. 2007-018848

(51) Int. Cl.
*G06F 15/173* (2006.01)
(52) U.S. Cl. ........ 709/224; 709/220; 709/221; 709/223; 709/230; 370/351; 370/395.42; 370/395.5; 370/395.31
(58) Field of Classification Search .......... 709/220–224, 709/227–229, 238–244; 370/351, 395.42, 370/395.31, 395.5
See application file for complete search history.

(56) References Cited

U.S. PATENT DOCUMENTS

| | | | |
|---|---|---|---|
| 6,546,425 B1 * | 4/2003 | Hanson et al. ................. | 709/227 |
| 6,930,984 B1 * | 8/2005 | Nomura et al. ............... | 370/254 |
| 7,260,635 B2 * | 8/2007 | Pandya et al. ................. | 709/226 |
| 7,440,456 B2 * | 10/2008 | Furukawa et al. ............ | 370/392 |

FOREIGN PATENT DOCUMENTS

WO    WO 00/60826    10/2000

OTHER PUBLICATIONS

S. Blake, et al., "An Architecture for Differentiated Services" [online], Dec. 1998, (retrieved on Dec. 15, 2006), Internet URL: http://www.ietf.org/rfc/rfc2475.txt.*

* cited by examiner

*Primary Examiner* — Carl Colin
*Assistant Examiner* — Mohammad Siddiqi
(74) *Attorney, Agent, or Firm* — Antonelli, Terry, Stout & Kraus, LLP.

(57) ABSTRACT

A technique is provided to dynamically change priority, according to content of communication data, when the communication data is relayed between a client device and a host device. A communication gateway (102) is a relay system for relaying the communication data between a thin client device (101) and the host device (103). The communication gateway (102) monitors communication performed by the host device (103) in response to a request from the thin client device (101). The communication gateway (120) determines priority of the communication that is returned to the client device by the host device (103) in response to the request, based on a protocol for the communication performed by the host device (103).

7 Claims, 10 Drawing Sheets

FIG. 4

300  INWARD COUPLING MANAGEMENT TABLE

| COUPLING SOURCE | | COUPLING DESTINATION | | ENTRY EXPIRATION TIME |
|---|---|---|---|---|
| IP ADDRESS | PORT NUMBER | IP ADDRESS | PORT NUMBER | |
| 10.1.1.1 | 1025 | 192.168.1.1 | 3389 | 11:31:45 |
| 10.1.1.2 | 1026 | 192.168.1.2 | 3389 | 11:31:51 |
| ... | ... | ... | ... | ... |
| 311 | 312 | 321 | 322 | 303 |
| 301 | | 302 | | |

FIG. 5

400 OUTWARD COUPLING MANAGEMENT TABLE

| COUPLING SOURCE | | COUPLING DESTINATION | | DELIVERY PRIORITY | ENTRY EXPIRATION TIME |
|---|---|---|---|---|---|
| IP ADDRESS | PORT NUMBER | IP ADDRESS | PORT NUMBER | | |
| 192.168.1.1 | 1027 | 172.16.1.1 | 80 | NORMAL | 11:31:40 |
| 192.168.1.2 | 1028 | 172.16.1.2 | 554 | HIGH | 11:31:49 |
| ... | ... | ... | ... | ... | ... |

500 SERVICE PRIORITY DEFINITIONS INFORMATION

| PORT NUMBER | DELIVERY PRIORITY |
|---|---|
| 80 | NORMAL |
| 443 | NORMAL |
| 554 | HIGH |
| 1755 | HIGH |
| 5005 | HIGH |
| ⋮ | ⋮ |
| OTHER THAN THOSE ABOVE | NORMAL |

511     512

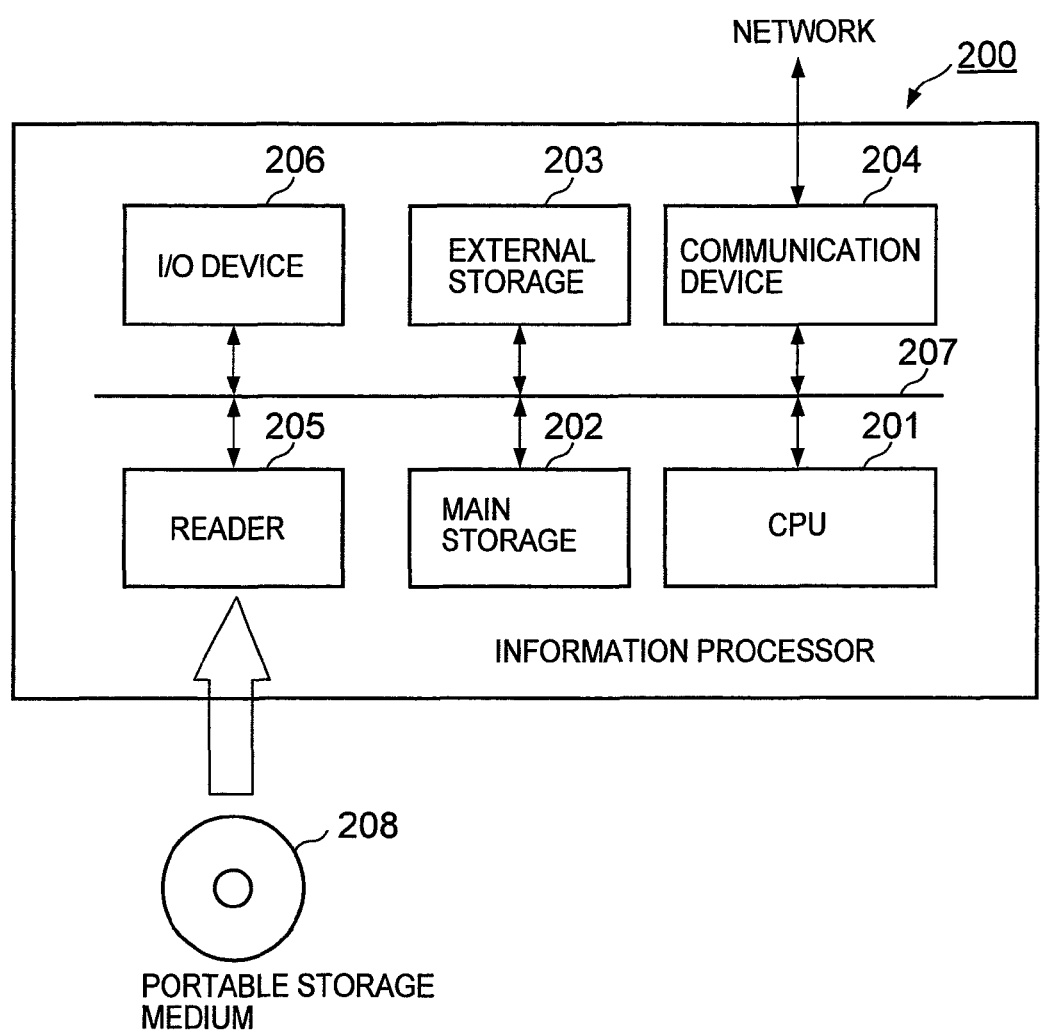

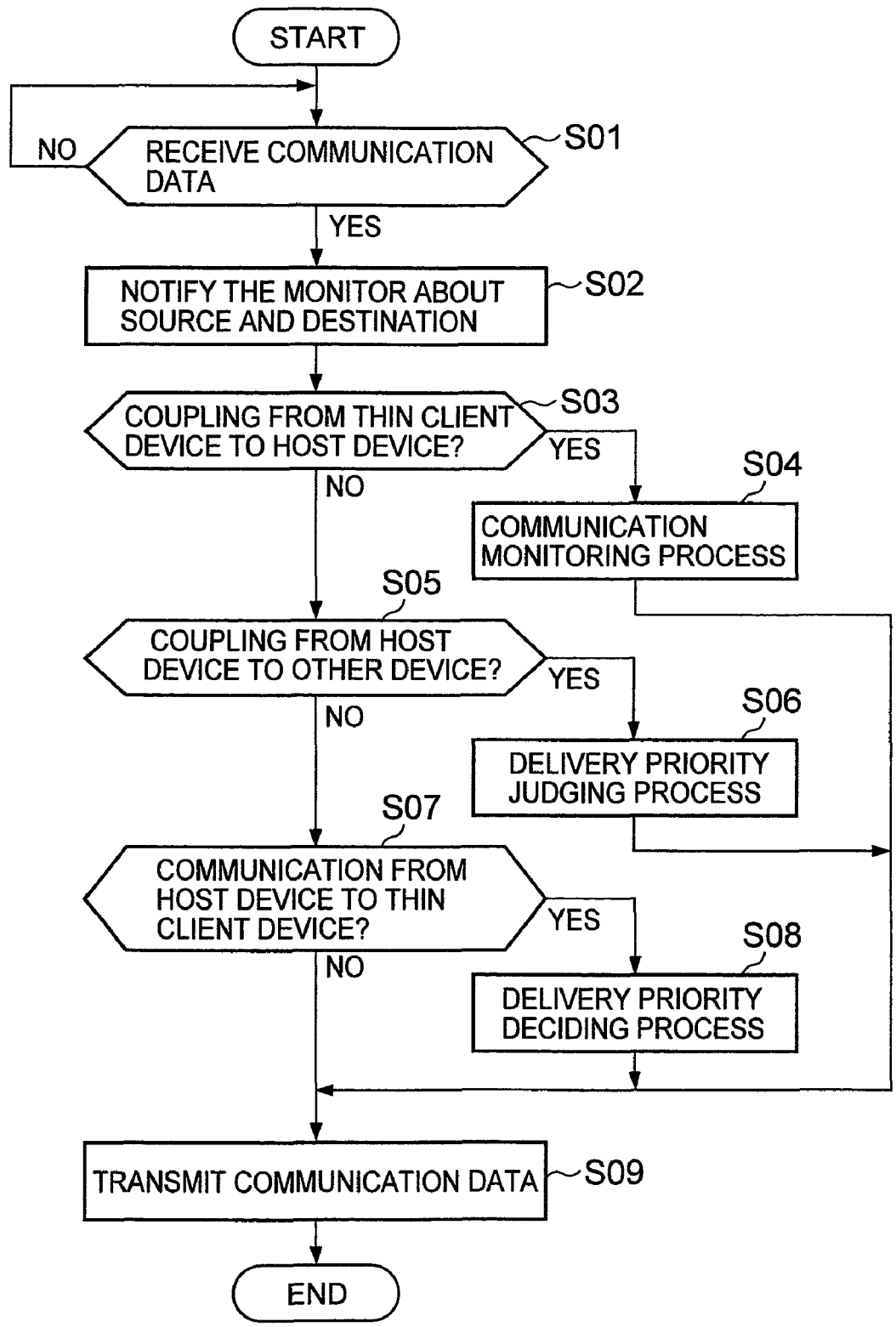

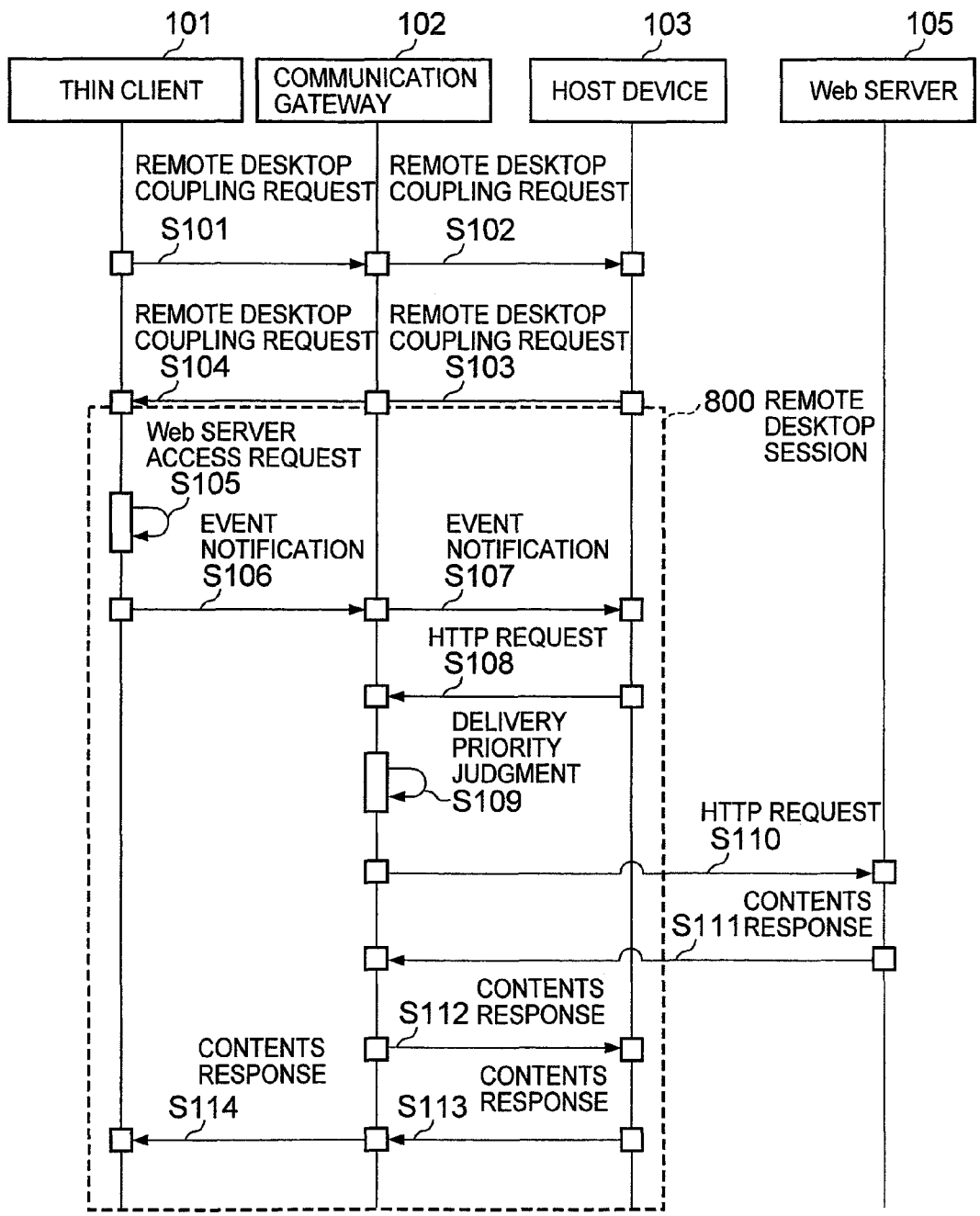

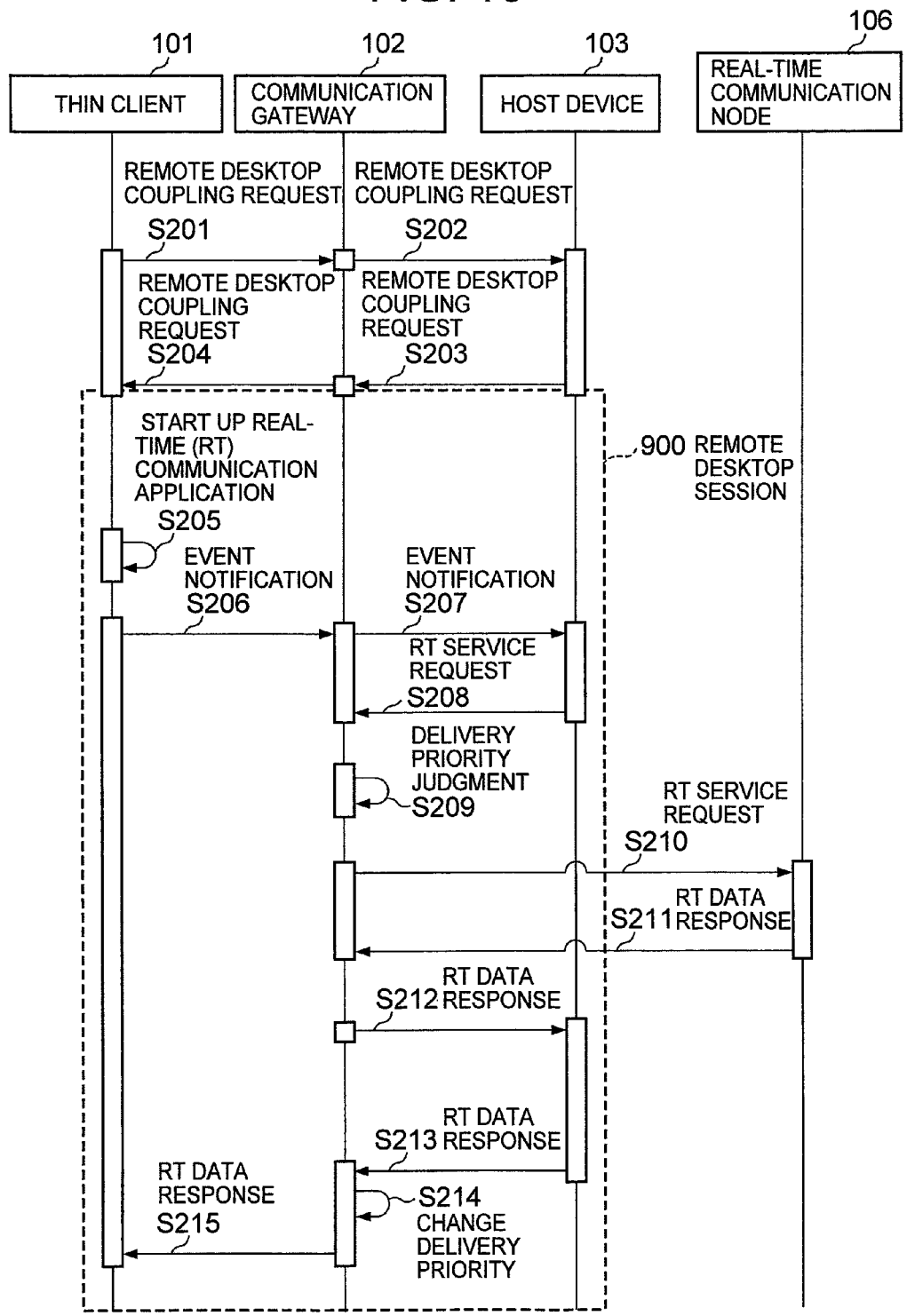

RELAY SYSTEM, RELAY PROGRAM, AND RELAY METHOD

INCORPORATION BY REFERENCE

This application claims priority based on a Japanese patent application, No. 2007-018848 filed on Jan. 30, 2007, the entire contents of which are incorporated herein by reference.

BACKGROUND OF THE INVENTION

The present invention relates to a technique to relay communication data between a client device and a host device.

In recent years, in corporate entities, information leakage due to loss or theft of notebook PCs is becoming a problem. As a way for solving this problem, there is an approach referred to as a "thin client system". In the thin client system, a client device is provided with a minimum required function only, whereas a server (host device) integrally controls application software and electronic files. As one such thin client system, there is a system that is called as "screen transfer type thin client system".

In the screen transfer type client system, a storage device such as an HDD (hard disk drive) does not reside on the client device. The host device accepts a remote login from the client device, and transfers a work screen to the client device.

In many cases, the client system described above takes a form in which a client device connected to the Internet is used by remotely coupling the client device with the host device. Therefore, there may be a delay in transferring the work screen from the host device. Accordingly, by way of example, it may take time for a mouse action or a key input on the client device to be reflected on the work screen transferred from the host device.

In order to improve the situation above, there is an approach for speeding up communication between the client device and the host device. Here, prioritized delivery by a router is taken as a measure for speeding up a particular network communication. This prioritized delivery is a technique in which a core router arranged in the Internet or an intranet transfers a particular communication flow packet, giving the packet a higher priority than other packets. This technique is utilized mainly to reduce transfer delay in a real-time communication application, such as video streaming and IP telephony. The core router that performs such prioritized delivery as described above is also referred to as QoS (Quality of Service) router. "Diffserv (Differentiated Services)" is taken as an example of a representative technique of such prioritized delivery. In simple terms, this technique involves setting a transfer priority to a header of a packet, and the core router performing the prioritized delivery according to the priority. The technique "Diffserv" is described in "S. Blake, et al. "An Architecture for Differentiated Services" [online], December 1998, (retrieved on Dec. 15, 2006), Internet URL: http://www.ietf.org/rfc/rfc2475.txt" (hereinafter, referred to as "non-patent document 1").

However, if priorities of all traffic are set to be high, the priority itself becomes meaningless. Therefore, some telecommunications carriers distinguish prioritized communication from non-prioritized communication by charging for a packet that is to be delivered with priority. Some other telecommunications carriers install a device on a network, dedicated to setting a transfer priority to the header of a packet, in order to prevent a user from taking the liberty of using the prioritized delivery. This dedicated device makes an assessment as to a communication application, according to a source port number or a destination port number of the communication data, and determines whether the communication is prioritized or not prioritized.

However, in cases where a telecommunications carrier is employed, who charges for the packet to be delivered with priority according to the Diffserv technique, communication charges may be very high if the prioritized delivery is simply applied to all communications. Therefore, considering the cost, it is desirable to exercise control as described below to suppress, to a minimal amount, the number of packets targeted for prioritized delivery. In other words, control is exercised so that normal communication quality is acceptable for remote desktop communication for operation in which efficiency is not much influenced by communication delay, such as, for example, document editing and web browsing via a browser, whereas the remote desktop communication is performed with prioritized delivery for watching streaming video or for IP telephone usage.

However, in the screen transfer type thin client system, a host PC merely transfers work screen information to a client PC, via the remote desktop communication. Screen data is exchanged between the thin client and the host, through one connection. In this case, when a device, which dedicated to setting the transfer priority to the header of the packet, is installed on the network, it is not possible to determine what kind of operation the user is performing, even when the remote desktop communication is being monitored. Therefore, it is difficult to exercise control to change the delivery priority of the remote desktop communication, according to the contents of the operation being performed by the user.

SUMMARY OF THE INVENTION

In view of the situation above, the present invention provides a technique to dynamically change the priority according to content of communication data, when the communication data is relayed between the client device and the host device.

In the present invention, in a relay system for relaying communication data between a client device and a host device, a priority of communication data transmitted to the client device is changed according to a protocol for communication that the host device performs with a communication server device such as Web server device.

Specifically, the relay system described above is a relay system for relaying communication data between a client device and a host device, and includes a storage unit for storing priority definition information specifying in advance a priority associated with each protocol, and a controller, wherein, the controller performs processing steps of: monitoring, in a first communication that the host device performs with the client device, a second communication between the host device and a communication server device, in response to a request from the client device, acquiring, from the priority definition information, a priority associated with a protocol in the second communication that the host device performs with the communication server device, setting the priority acquired from the priority definition information based on the second communication, as a priority of communication data that is returned to the client device, the communication data being generated based on the second communication as a response of the host device to the request in the first communication, and transmitting the communication data for which the priority has been set, with the client device as a destination.

According to the aspect of the invention as described above, in the screen transfer type thin client system, the relay system monitors a protocol by which the host device communicates with a server device on the network, other than the client device, and if the host device performs communication with an Internet server using a protocol of high real-time quality, the delivery priority of the remote desktop communication between the relay system and the client device is set to be high. Accordingly, communication quality of the remote desktop communication is dynamically controlled according to the content of work performed by the user, thereby enhancing usability for the user.

According to the present invention, the communication quality of the remote desktop communication in the thin client system is improved and usability for the user can be enhanced.

These and other benefits are described throughout the present specification. A further understanding of the nature and advantages of the invention may be realized by reference to the remaining portions of the specification and the attached drawings.

BRIEF DESCRIPTION OF DRAWINGS

FIG. 4 conceptually illustrates a data structure of an inward management table;

FIG. 5 conceptually illustrates a data structure of an outward management table;

FIG. 6 conceptually illustrates a data structure of service priority definition information;

FIG. 7 illustrates one example of a hardware configuration of each information processor relating to an embodiment of the present invention;

FIG. 8 is a flowchart showing a delivery priority decision process that is executed in the communication gateway;

FIG. 9 illustrates a timing chart when a normal delivery is performed in the communication system; and FIG. 10 illustrates a timing chart when a prioritized delivery is performed in the communication system.

DETAILED DESCRIPTION OF THE EMBODIMENTS

Figure 1:
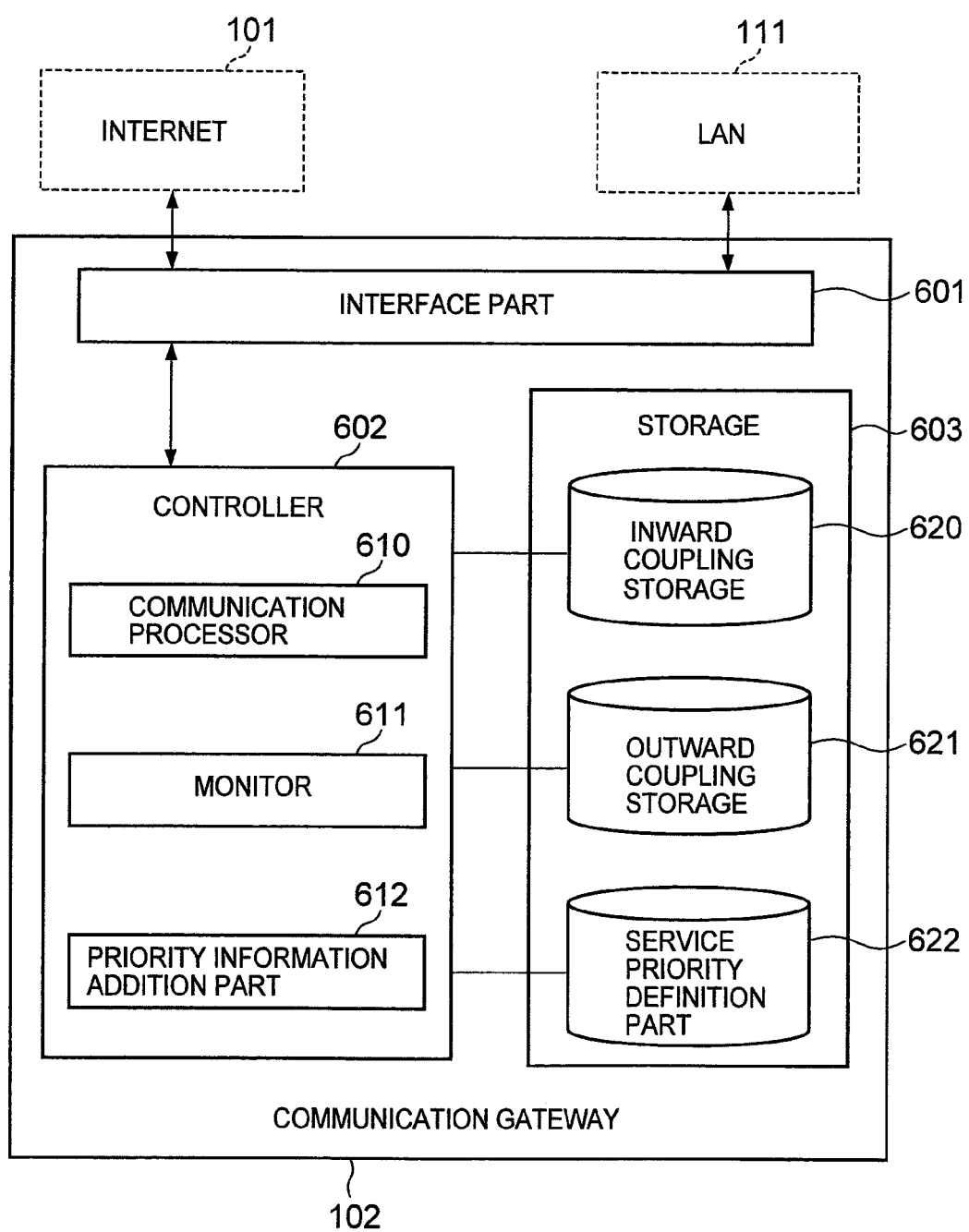
FIG. 1 is a functional block diagram of a communication gateway relating to an embodiment of the present invention.

FIG. 1 is a schematic diagram of a communication gateway 102 according to one embodiment of the present invention.

As illustrated, the communication gateway 102 incorporates an interface 601, a controller 602, and a storage unit 603.

Figure 2:
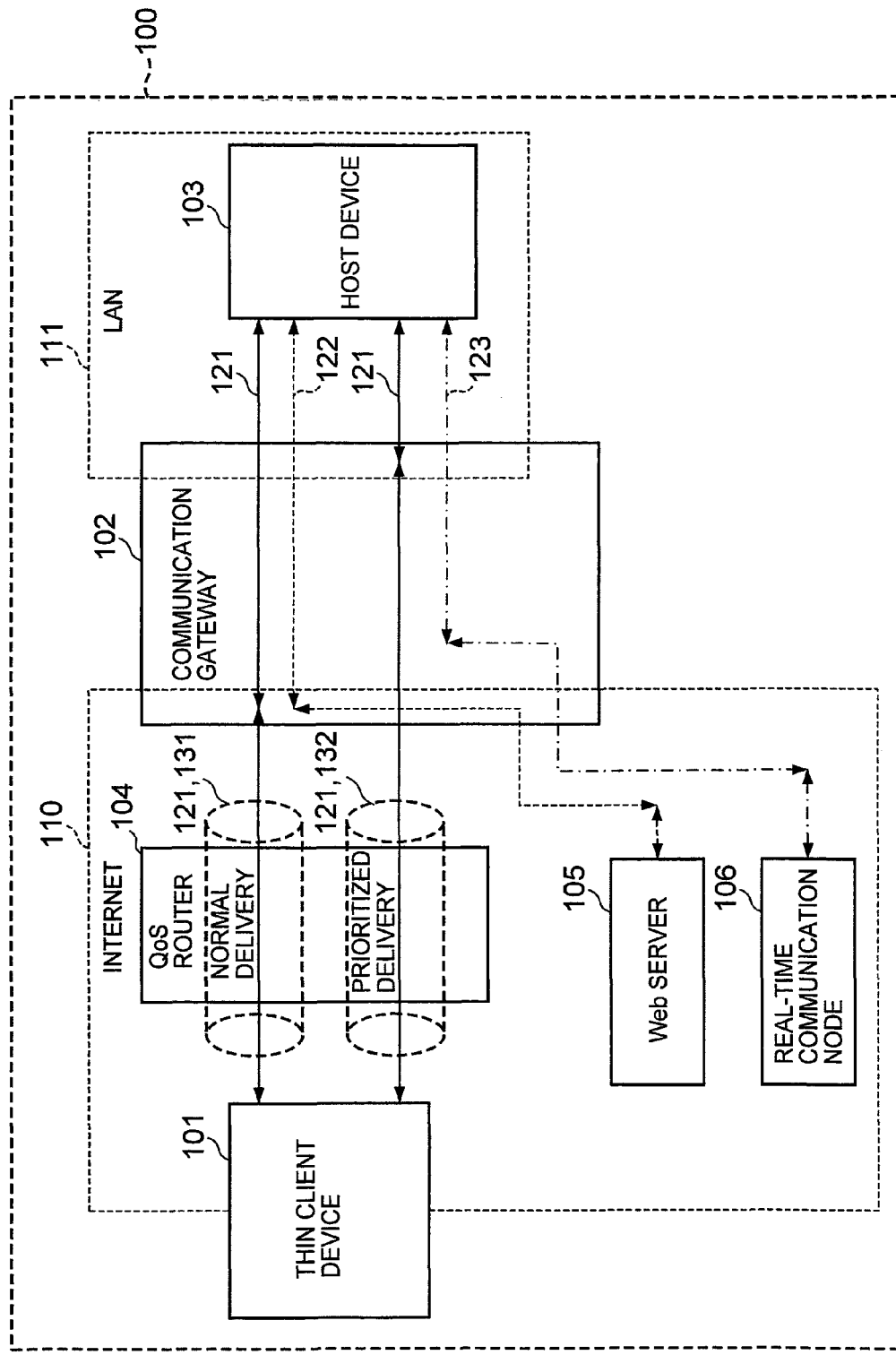
FIG. 2 is a block diagram showing one example configuration of a communication system relating to an embodiment of the present invention.

The communication gateway 102 of the present embodiment is used in a communication system 100 as shown in FIG. 2, for instance.

As illustrated, the communication system 100 incorporates a thin client device 101, the communication gateway 102, a host device 103, and a QoS router 104. The thin client device 101 is connected to the Internet 110, and the host device 103 is connected to a LAN (Local Area Network) 111. These devices are configured in such a manner that mutual communication therebetween is established via the communication gateway 102, which relays the communication between the Internet 110 and the LAN 111.

In addition, a real-time communication node 106 and a Web server 105 are connected to the Internet 110. The host device 103 establishes coupling with the real-time communication node 106 and the Web server 105, in response to a request from the thin client device 101, acquires particular data therefrom, and transfers the data to the thin client device 101. Here, remote desktop communication 121 is performed between the host device 103 and the thin client device 101, via the communication gateway 102. The remote desktop communication 121 allows the thin client device 101 to remotely control applications stored in the host device 103. A protocol used for performing the remote desktop communication 121 may be, for example, RDP (Remote Desktop Protocol), or the like.

The communication gateway 102 monitors communication in the host device 103, and decides priority of transmitted data, according to the communication protocol of the transmitted data from the host device 103. Thereafter, the QoS router 104 controls the transfer of the transmitted data according to the priority.

It is to be noted that the Web server 105 is a server device that provides Web content such as HTML (HyperText Markup Language) files.

The real-time communication node 106 is a server device that provides streaming data such as video files.

Returning to FIG. 1, the interface 601 is an interface for sending and receiving communication data (packets) via the Internet 110 and the LAN 111.

The storage unit 603 incorporates an inward coupling storage unit 620, an outward coupling storage unit 621, and a service priority definition part 622.

The inward coupling storage unit 620 stores information that specifies a coupling from the thin client device 101 to the host device 103.

By way of example, the inward coupling storage unit 620 stores an inward coupling management table 300 as shown in FIG. 4.

As illustrated, the inward coupling management table 300 is provided with a coupling source field 301, a coupling destination field 302, and an entry validity period field 303. The coupling source field 301 includes an IP address field 311 and a port number field 312. The coupling destination field 302 includes an IP address field 321 and a port number field 322.

A new entry is set in the inward coupling management table 300, every time a coupling is established from the thin client device 101 to the host device 103. Then, the IP address field 311 and the port number field 312 of the coupling source field 301 respectively store the IP address and the port number of the thin client device 101 as the coupling source. In addition, the IP address field 321 and the port number field 322 of the coupling destination field 302 respectively store the IP address and the port number of the host device 103 as the coupling destination.

Information specifying a predetermined validity period of the entry is stored in the entry validity period field 303. When the validity period of the entry expires, the entry is made invalid. An area of the invalid entry may be reused when a new entry is added. In the present embodiment, for the validity period, information is stored, specifying a period (hours and minutes), which is a validity period from when the communication gateway 102 detects a coupling from the thin client device 101 to the host device 103. However, the present invention is not limited to such an aspect of the invention.

The outward coupling storage unit 621 stores information specifying a coupling, when the host device 103 establishes the coupling with a device other than the thin client device 101, via the Internet 110.

For example, the outward coupling storage unit 621 stores an outward coupling management table 400 as shown in FIG. 5.

As illustrated, the outward coupling management table 400 is provided with a coupling source field 401, a coupling destination field 402, a delivery priority field 403, and an entry validity period field 404. The coupling source field 401 includes an IP address field 411 and a port number field 412. The coupling destination field 402 includes an IP address field 421 and a port number field 422.

A new entry is set in the outward coupling management table 400, every time a coupling is established from the host device 103 to a device other than the thin client device 101 via the Internet. Then, the IP address field 411 and the port number field 412 of the coupling source field 401 respectively store the IP address and the port number of the host device 103 as the coupling source. In addition, the IP address field 421 and the port number field 422 of the coupling destination field 402 respectively store the IP address and the port number of the device as the coupling destination (in the present embodiment, the Web server 105 or the real-time communication node 106).

The delivery priority field 403 stores a value indicating a priority when data is transferred when there is a response to the thin client device 101 from the host device 103. Here, in the present embodiment, the value being stored in this field represents "normal" which specifies that the delivery is a normal delivery 131 and the prioritized delivery 132 by the Diffserv is not performed, or represents "high" which specifies that the delivery is the prioritized delivery 132 for performing the prioritized delivery 132 by the Diffserv.

Information specifying a predetermined validity period of the entry is stored in the entry validity period field 404. When the validity period of the entry expires, the entry is made invalid. An area of the invalid entry may be reused when a new entry is added. In the present embodiment, the validity period information is stored, specifying a period (hours and minutes), which is a validity period from when the communication gateway 102 detects a coupling from the thin host device 103. However, the present invention is not limited to such an aspect of the invention.

The service priority definition part 622 stores a protocol that is used when communication is established from the host device 103 to a device other than the thin client device 101 via the Internet 110, and information specifying the priority associated with the protocol.

By way of example, the service priority definition part 622 stores a service priority definition table 500 as shown in FIG. 6.

The service priority definition table 500 includes a port number field 511 and a delivery priority field 512.

The port number field 511 stores information specifying the port number of the device as a destination when communication is established from the host device 103 to a device other than the thin client device 101 via the Internet. This is because it is possible to identify the protocol that is used for the communication according to the port number.

The delivery priority field 512 stores information that identifies a priority in the communication using the port number specified in the port number field 511. Here, in the present embodiment, the delivery priority field 512 stores the text "normal" which specifies that the delivery is a normal delivery 131 and the prioritized delivery 132 by the Diffserv is not performed, or the text "high" which specifies that the delivery is the prioritized delivery 132 for performing the prioritized delivery 132 by the Diffserv. By way of example, the delivery priority 512, "normal", is associated in advance with HTTP communication 122 (associated port number "80") or the like, for which real-time communication is not required, and stored. Furthermore, the delivery priority 512, "high", is associated in advance with real-time communication 123 (associated port number "554") or the like, for which real-time communication is required, and stored.

Returning to FIG. 1, the controller 602 incorporates a communication processor 610, a monitor 611, and a priority information addition part 612.

The communication processor 610 controls the communication via the Internet 110 and the LAN 111, and particularly in the present embodiment, the communication processor 610 performs TCP/IP stack processing or UDP/IP stack processing.

The communication processor 610 further performs processing to notify the monitor 611 about the IP addresses and the port numbers of the source and destination of the communication data in the communication via the Internet 110 and LAN 111.

The monitor 611 monitors the IP addresses and the port numbers of the source and destination in the communication data (packets) supplied from the communication processor 610, and performs processing for storing in the storage unit 603, the IP address and the port number of a particular source or the IP address and the port number of a particular destination, and processing for making a notification to the prioritized information addition part 611, at the time of communication with the IP address and the port number, of the particular source and with the IP address and the port number of the particular destination.

By way of example, upon detecting a coupling from the thin client device 101 to the host device 103, the monitor 611 generates a new entry in the inward coupling management table 300 in the inward coupling storage unit 620 in the storage unit 603. In addition, the monitor 611 respectively stores the IP address and the port number of the thin client device 101 which is the coupling source in the IP address field 311 and the port number field 312 of the coupling source field 301, and respectively stores the IP address and the port number of the host device 103 which is the coupling destination, in the IP address field 321 and the port number field 322 of the coupling destination field 302. In addition, the monitor 611 stores information specifying a predetermined validity period of the entry, in the entry validity period field 303.

It is to be noted here that the coupling from the thin client device 101 to the host device 103 can be detected by storing, in the storage unit 603 or the like, in advance, the information specifying the IP address of the thin client device 101, or the IP address and the port number of the host device 103, and by determining whether or not there are any matches with the information being stored.

In addition, upon detecting a coupling from the host device 103 to the device other than the thin client device 101 via the Internet 110, the monitor 611 generates a new entry in the outward coupling management table 400 in the outward coupling storage unit 621 in the storage unit 603. In addition, the monitor 611 stores the IP address and the port number of the host device as the coupling source, respectively, in the IP address field 411 and the port number field 412 of the coupling source field 401, and stores the IP address and the port number of the device as the coupling destination (in the present embodiment, the Web server 105 or the real-time communication node 106) respectively, in the IP address field 421 and the port number field 422 of the coupling destination field 402. In addition, the monitor 611 stores information specifying a predetermined validity period of the entry in the entry validity period field 404. Then, the monitor 611 searches the port number field 511 of the service priority definitions table 500 for the port number of the coupling destination, and identifies from the delivery priority field 512, information that specifies the priority associated with the port number being retrieved. Then, the monitor stores the information specifying the priority being identified in the delivery priority field 403.

It is to be noted here that the coupling from the host device 103 to a device other than the thin client device 101, via the Internet, can be detected by determining whether or not an IP address corresponding to the IP address of a device other than the thin client device is stored in the coupling source field 301 of the inward coupling management table 300, for instance.

Furthermore, when a coupling from the host device 103 to the thin client device 101 via the Internet 110 is detected, the monitor 611 acquires information specifying the priority from the delivery priority field 403 of the entry, if the IP address of the host device 103 as a source in the coupling is stored in the coupling source field 401 of the outward coupling management table 400, and notifies the priority information addition part 612 described below about the acquired information specifying the priority.

In addition, when the coupling from the host device 103 to the thin client device 101 via the Internet 110 is detected, and if the IP address of the host device 103 as a source in the coupling is not stored in the coupling source field 401 of the outward coupling management table 400, the monitor 611 determines the information specifying priority as "normal", and notifies the priority information addition part 612 about this information.

It is to be noted here that the coupling from the host device 103 to the thin client device 101 via the Internet can be detected by determining whether or not an IP address corresponding to the IP address of the thin client device being the destination stored in the coupling source field 301 of the inward coupling management table 300, for instance.

Upon receipt of the notification from the monitor 611, the priority information addition part 612 performs processing to change the priority of the communication data, so that the priority is set to be the priority specified by the notification.

Figure 3:
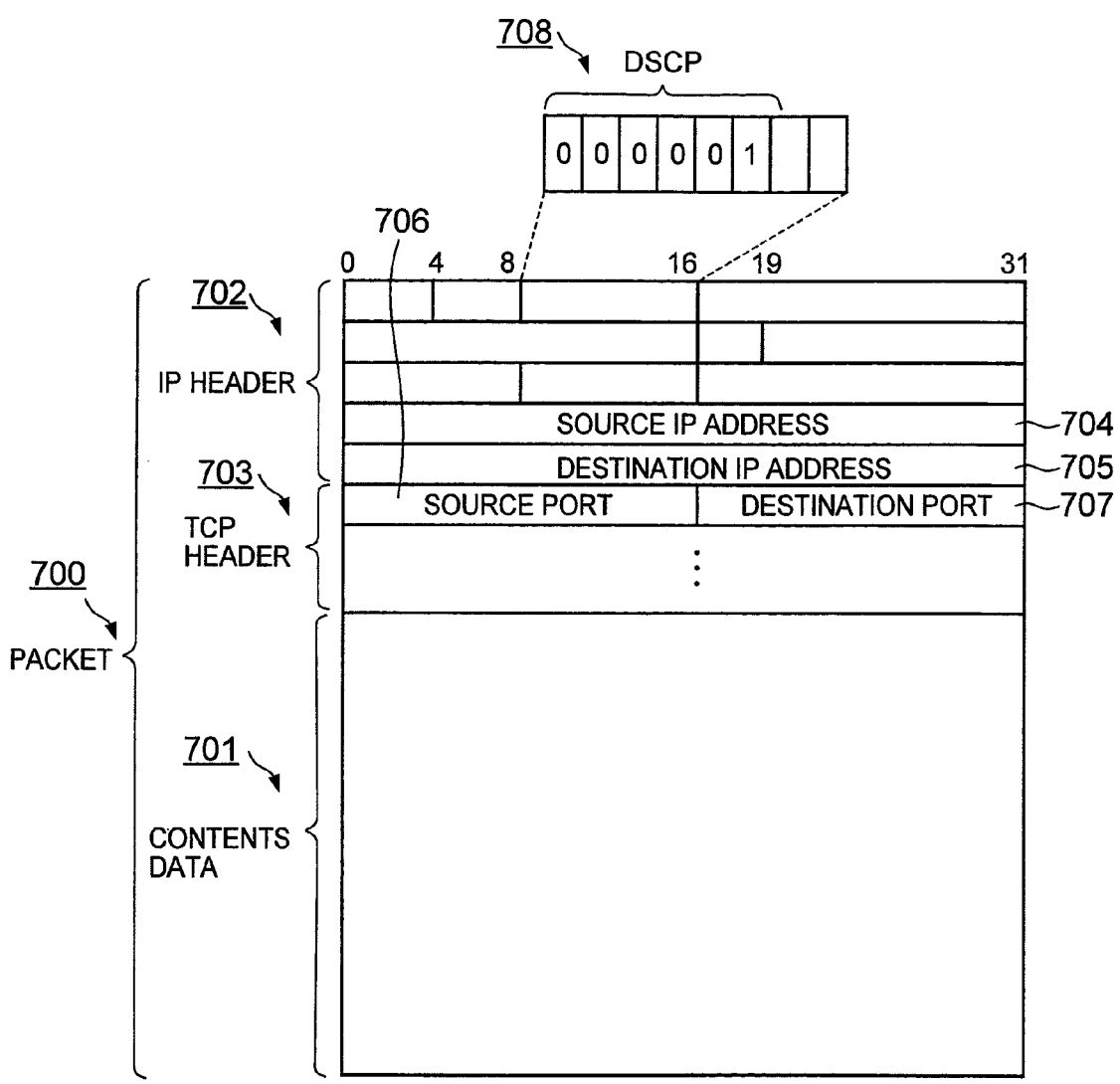
FIG. 3 conceptually illustrates a data structure of a packet.

By way of example, as shown in FIG. 3, a packet 700 has a data structure, in which control information (IP header 702 and TCP header 703) for controlling the sending and receiving of the packet is added to content data 701 in which an HTML file, a video file, or the like, are split up.

In addition, the IP header 702 contains a DSCP (Diffserv codepoint) 708, a source IP address 704, a destination IP address 705, and the like. Here, the DSCP 708 indicates a value of 6 bits, representing the delivery priority of the packet 700. It is defined that the larger the value of the DSCP 708 is, the higher the delivery priority is.

Therefore, upon receipt of the notification from the monitor 611, the priority information addition part 612 changes the value of the DSCP 708 to a value corresponding to the priority that is specified by the notification, or keeps the value unchanged. Here, by way of example, if the information specifying the priority indicates "normal", the value of the DSCP 708 is set to "000000", and if the information specifying the priority indicates "high", the value of the DSCP 708 is set to "000001".

The packet 700 having been processed by the priority information addition part 612 as described above is delivered to the Internet 110, via the communication processor 610 and the interface 601.

The communication gateway 102 configured as described above can be implemented by a general computer 200, incorporating, for example as shown in FIG. 7, a CPU 201, a main storage unit 202, an external storage unit 203 such as HDD, a reader 205 for reading information from a storage medium 208, which is portable such as a CD-ROM or a DVD-ROM, an I/O device 206, such as a display, a keyboard, and a mouse, and a communication device 204 such as a NIC (Network Interface Card) for establishing a connection with the communication network.

For example, the storage unit 603 can be implemented by the external storage unit 203, and the controller 602 can be implemented by loading a predetermined program stored in the external storage unit 203 in the main storage unit 202, so that the CPU 201 executes the program. The interface 601 can be implemented by the communication device 204.

It is further possible that this predetermined program is downloaded from the storage medium 208 via the reader 205, or from the network via the communication device 204, into the external storage unit 203. Then, the program is loaded in the main storage unit (memory) 202, and executed by the CPU 201. Furthermore, the program may be loaded in the memory 202 directly from the storage medium 208 via the reader 205, or from the network via the communication device 204, and executed by the CPU 201.

As thus described, the communication gateway 102 according to the present embodiment is capable of deciding the delivery priority of the communication data (packet) according to a communication protocol (service).

It is to be noted that the QoS router 104 existing on a path between the thin client device 101 and the communication gateway 102 transfers data (packet) in the remote desktop communication 121 between the thin client device 101 and the communication gateway 102. Then, the QoS router 104 controls the order of transfer, according to the priority of the packet transfer, which is added to the data (packet).

With the configuration as described above, the communication gateway 102 is capable of dynamically controlling a communication quality of the remote desktop communication, according to the communication service that is used by a user during the remote desktop communication.

FIG. 8 is a flowchart showing a processing that is performed in the communication gateway 102.

Upon receipt of the communication data via the interface 601 (S01), the communication processor 610 of the communication gateway 102 notifies the monitor 611 about the IP addresses and the port numbers of the source and the destination of the received communication data (S02).

The monitor 611 of the communication gateway 102 determines whether the IP addresses and the port numbers of the source and the destination notified from the communication processor 610 indicate a coupling from the thin client device 101 to the host device 103 (S03). On this occasion, in cases of a coupling from the thin client device 101 to the host device 103, the monitor 610 proceeds with step S04, but otherwise, proceeds with step S05.

In step S04, the monitor 611 of the communication gateway 102 performs a communication monitoring process (S04). The communication monitoring process here performs the following; generating a new entry in the inward coupling management table 300, storing the IP address and the port number of the thin client device 101 as the coupling source, respectively in the IP address field 311 and the port number field 312 of the coupling source field 301, storing the IP address and the port number of the host device 103 as the coupling destination, respectively in the IP address field 321 and the port number field 322 of the coupling destination field 302, and storing information specifying a predetermined validity period of the entry in the entry validity period field 303.

In step S05, the monitor 611 of the communication gateway 102 determines whether the IP addresses and the port numbers of the source and the destination notified from the communication processor 610 indicate that the coupling is from the host device 103 to a device other than the thin client device 101 (S05). Here, when the monitor 611 determines that it is a coupling from the host device 103 to a device other than the thin client device 101, the processing proceeds with step S06, whereas when the monitor 611 determines that it is not a coupling from the host device 103 to a device other than the thin client device 101, the processing proceeds with step S07.

In step S06, the monitor 611 of the communication gateway 102 performs a delivery priority judging process (S06) The delivery priority judging process here performs the following; generating a new entry in the outward coupling management table 400 in the outward coupling storage unit 621, storing the IP address and the port number of the host device 103 as the coupling source respectively in the IP address field 411 and the port number field 412 of the coupling source field 401, storing the IP address and the port number of the device (in the present embodiment, the Web server 105 or the real-time communication node 106) as the coupling destination respectively in the IP address field 421 and the port number field 422 of the coupling destination field 402, and storing information specifying a predetermined validity period of the entry in the entry validity period field 404. Then, the monitor 611 searches the port number field 511 of the priority definitions table 500 for the port number of the coupling destination, and identifies from the delivery priority field 512, information that identifies the priority associated with the port number being retrieved. Then, the monitor stores the information specifying the priority identified in the delivery priority field 403.

In step S07, the monitor 611 of the communication gateway 102 determines whether the IP addresses and the port numbers of the source and the destination notified from the communication processor 610 indicate that the communication is from the host device 103 to the thin client device 101 (S07). Here, when the monitor 611 determines that it is the communication from the host device 103 to the thin client device 101, the processing proceeds with step S08, whereas when the monitor 611 determines that it is not the communication from the host device 103 to the thin client device 101, the processing proceeds with step S09.

In step S08, the monitor 611 of the communication gateway 102 makes a notification to the priority information addition part 612, and the priority information addition part 612 performs the delivery priority deciding process (S08). The delivery priority deciding process here indicates a process to change the priority of the communication data upon receipt of the notification from the monitor 611, so that the priority agrees with the one being notified.

After going through the processing as described above, in step S09, the communication processor 610 of the communication gateway 102 transmits the communication data received in step S01, via the interface 601 (S09).

Next, with reference to the sequence diagrams as shown in FIG. 9 and FIG. 10, an explanation will be made as to a delivery process of the packet 700, which is performed in the entire communication system 100 as shown in FIG. 2. FIG. 9 is a sequence diagram showing that the communication system 100 performs a normal delivery 131.

Upon receipt of a request signal from the thin client device 101, requesting a start of the remote desktop communication 121 with the host device 103 (step S101), the interface 601 of the communication gateway 102 starts a series of delivery processes (step S01).

On this occasion, the interface 601 of the communication gateway 102 supplies the controller 602 with the packet 700 received from the thin client device 101 (step S02). Then, according to the destination IP address in the received packet 700, it is determined that the coupling is directed to the host device 103 (step S03). Subsequently, according to the communication monitoring process (step S04), the monitor 611 of the controller 602 writes the source IP address 704, the destination IP address 705, the source port 706, and the destination port 707 within the received packet 700, into the inward coupling management table 300 in the inward coupling storage unit 603.

Next, according to step S09, the controller 602 transfers the request signal received in step S101 to the host device 103 (step S102). Specifically, the interface 601 transmits the packet 700 returned from the controller 602 to the host device 103 to which the destination IP address 705 is assigned.

The host device 103 that received the request signal transferred in step S102 transmits a response signal to start the remote desktop communication 121, to the thin client device 101 via the communication gateway 102 (step S103 and step S104). Accordingly, a remote desktop session 800 (inside the broken line in FIG. 9) is started.

After the remote desktop session 800 is started, the thin client device 101 is allowed to remotely operate the application stored in the host device 103.

For example, when a user who is operating the thin client device 101 starts up a browser stored in the host device 103 so as to access the Web server 105, the thin client device 101 generates a Web server access request (step S105). On this occasion, the thin client device 101 incorporates, in the Web server access request, information such as a URL to identify a Web page stored in the Web server 105 on the Internet 110.

Subsequently, the thin client device 101 transmits (makes an event notification of) the packet 700, which is generated by setting the Web server access request as the content data 701, to the host device 103 via the communication gateway 102 (step S106 and step S107).

The Web browser of the host device 103 which receives the event notification in step S107 transmits, to the communication gateway 102, the packet 700 (HTTP request) based on the event notification (step S108).

On this occasion, the interface 601 of the communication gateway 102 passes the received packet 700 to the controller 602 (steps S01 and S02).

Here, from the destination IP address in the received packet 700, it is determined that the coupling is with another device (steps S03 and S05). The controller 602 performs the process (step S06) to determine the delivery priority of the packet 700 that is passed from the interface 601 (step S109). Specifically, the monitor 611 in the controller 602 writes the source IP address 704, the source port 706, the destination IP address 705, and the destination port 707 within the packet 700, into the outward coupling management table 400 in the outward coupling storage unit 604. In addition, the monitor 611 extracts the delivery priority 512 associated with the destination port 707, from the service priority definitions information 500 stored in the service priority definition part 605. Since "80" is written in the destination port 707, the delivery priority 512 that has been extracted is "normal". The monitor 611 writes the delivery priority 512 that has been extracted into the outward coupling management table 400, after making an association with previously written data (the source IP address 704, and the like).

Subsequently, in step S09, the controller 602 of the communication gateway 102 transmits the packet 700 (HTTP request) received in step S108 to the Web server 105 (step S110).

The Web server 105 that has received the packet 700 (HTTP request) in step S110 transmits, to the communication gateway 102, a Web page (content) indicated by the URL included in the content data 701 of the packet 700 (step S111). Specifically, the Web server 105 generates the packet 700 in which the Web page (html file) is set as the content data 701, and transmits this packet to the communication gateway 102.

Then, the communication gateway 102 transfers the packet 700 including the Web page, which is transmitted in step S111, to the host device 103 (step S112).

Furthermore, the host device 103 transmits via the communication gateway 102 to thin client device 101, desktop screen data in a state in which descriptions of the content data 701 included in the packet 700 received in step S112 are displayed (step S113). Specifically, the host device 103 generates screen data that enables the descriptions of the content data 701 to be displayed on the thin client device 101, further generates the packet 700 by adding the IP header 702 and the TCP header 703 to the screen data, which allows the screen data to be transmitted to the thin client device 101, and then transmits the packet 700 to the communication gateway 102.

On this occasion, the interface 601 of the communication gateway 102 passes the packet 700 received in step S113 to the controller 602 (steps S01 and S02). Then, it is determined that the communication is directed to the thin client device 101, according to the destination IP address in the received packet 700 (steps S03, S05 and S07). The priority information addition part 612 of the controller 602 firstly extracts the source IP address 704 within the packet 700. The priority information addition part 612 searches the IP address 411 in the outward coupling management table 400 for the IP address matching the source IP address 704 that has been extracted. Here, if a matching IP address is found, the priority information addition part 612 refers to the delivery priority 403 ("normal"), which is stored so as to be associated with the corresponding IP address 411. Subsequently, the priority information addition part 602 changes the value of DSCP 709 of the packet 700, according to the delivery priority 403 that is referred to, and passes the packet 700, which was changed, to the interface 601 (step S08) However, if it is not necessary to change the value of DSCP 709, the priority information addition part 602 may pass the packet 700 to the interface 601 without changing the value of DSCP 709.

Afterwards, in step S09, the interface 601 of the communication gateway 102 transmits the packet 700 passed from the controller 602 to the thin client device 101 via the QoS router 104 (step S114). On this occasion, as described above, the QoS router 104 transfers the packet 700 to the thin client device 101, according to the delivery priority of the received packet 700.

The processing as described above is delivery processing when the normal delivery 131 is performed in the communication system 100.

On the other hand, FIG. 10 is a sequence diagram in cases where a priority delivery 132 is performed in the entire communication system 100.

In performing the priority delivery 132, the processing from step S201 to step S204 before the remote desktop session 900 (inside the broken line in FIG. 10) is the same as the processing from step S101 to step S104 when the normal delivery 131 is performed.

After the remote desktop session 900 is started, for example, if a user who is operating the thin client device 101 starts up a video reproducer stored in the host device 103 to access the real-time communication node 106, the thin client device 101 generates a real-time communication node access request (step S205). On this occasion, the thin client device 101 includes, in the real-time communication node access request, information such as a URL to identify streaming data stored in the real-time communication node 106 on the Internet 110.

Subsequently, the thin client device 101 transmits (makes an event notification of) the packet 700, which is generated by setting the real-time communication node access request as the contents data 701, to the host device 103 via the communication gateway 102 (step S206 and step S207).

A video reproducer in the host device 103 that has received the event notification in step S207 transmits the packet 700 (RT service request), based on the event notification, to the communication gateway 102 (step S208).

On this occasion, the interface 601 of the communication gateway 102 passes the received packet 700 to the controller 602 (step S01 and step S02).

Next, from the destination IP address in the received packet 700, it is determined that the coupling is directed to another device (steps S03 and S05). The controller 602 performs a process (step S06) to determine the delivery priority of the packet 700 passed from the interface 601 (step S209). Specifically, the monitor 611 in the controller 602 writes the source IP address 704, the source port 706, the destination IP address 705, and the destination port 707 within the packet 700, into the outward coupling management table 400 in the outward coupling storage unit 604. In addition, the monitor 611 extracts the delivery priority 512, associated with the destination port 707, from the service priority definitions information 500 stored in the service priority definition part 605. In this example here, since "554" is written in the destination port 707, the delivery priority 512 that is extracted is "high". The monitor 611 writes the delivery priority 512 that has been extracted into the outward coupling management table 400, so as to make an association with previously written data (the source IP address 704, and the like).

Subsequently, according to step S09, the controller 602 of the communication gateway 102 transmits the packet 700 (RT service request) received in step S208 to the real-time communication node 106 (step S210).

The real-time communication node 106, which received the packet 700 (RT service request) in step S210, transmits to the communication gateway 102 streaming data indicated by the URL included in the content data 701 of the packet 700 (step S211). Specifically, the real-time communication node 106 generates the packet 700 in which the streaming data is set as the content data 701, and transmits this packet to the communication gateway 102.

Here, the communication gateway 102 transfers the packet 700 including the streaming data having been received in step S210, to the host device 103 (step S212).

Furthermore, the host device 103 transmits via the communication gateway 102 to thin client device 101, desktop screen data in a state in which the descriptions of the contents data 701 included in the packet 700 received in step S212 are displayed (step S213). Specifically, the host device 103 generates screen data that enables the descriptions of the content data 701 to be displayed on the thin client device 101, further generates the packet 700 by adding the IP header 702 and the TCP header 703 to the screen data, which allows the screen data to be transmitted to the thin client device 101, and then transmits the packet 700 to the communication gateway 102.

On this occasion, the interface 601 of the communication gateway 102 passes the packet 700 received in step S213 to the controller 602 (steps S01 and S02). Then, it is determined that the communication is directed to the thin client device 101, according to the destination IP address in the received packet 700 (steps S03, S05 and S07). The priority information addition part 612 of the controller 602 firstly extracts the source IP address 704 within the packet 700. The priority information addition part 612 searches the IP address 411 in the outward coupling management table 400 for the IP address agreeing with the source IP address 704 that has been extracted. Here, if a matching IP address is found, the priority information addition part 612 refers to the delivery priority 403 ("high"), which is stored so as to make an association with the corresponding IP address 411. Subsequently, the priority information addition part 612 changes the value of DSCP 709 of the packet 700 according to the delivery priority 403 that is referred to (step S214), and passes the packet 700 that has been changed, to the interface 601 (step S08).

Afterwards, according to step S09, the interface 601 of the communication gateway 102 transmits the packet 700 passed from the controller 602 via the QoS router 104 to the thin client device 101 (step S215). On this occasion, as described above, the QoS router 104 transfers the packet 700 to the thin client device 101, according to the delivery priority of the received packet 700.

In the present communication system 100, it is possible to dynamically control the communication quality of the remote desktop communication, in accordance with the communication service used during remote desktop communication by a user.

It is to be noted here that the present invention is not limited to the embodiment as described above, and various modifications and applications are available.

For example, in the embodiment described above, the delivery priority has two levels, "normal" and "high". However, the present invention is not limited to this embodiment, and the delivery priority may have three or more levels, according to the protocol (communication service).

In addition, in the embodiment described above, a protocol for the communication is identified by the port number. However, the present invention is not limited to this embodiment, and identification may be performed by any identifier that can identify the protocol. For example, a configuration is possible in which HTTP communication directed to a particular URL is handled with high priority, by setting a destination URL of the HTTP as an identifier.

In the embodiment described above, the priority of a protocol used in the real-time communication is set to be "high". However, the present invention is not limited to this embodiment, and according to the environment in which the communication system is applied, the priority stored in the service priority definition information 500 may be configured arbitrarily.

The method for deciding the value of DSCP 708, when the host device 103 transmits the packet 700 to the thin client device 103, is arbitrary. For example, an enterprise which owns the host device 103 may set a high value for the DSCP value of the packet 700, for which a charge is made. In any case, in the present embodiment as described above, it is possible to change the value of the DSCP 708 of the packet 700, which is transmitted from the host device 103 (to the thin client device 101), in accordance with the priority stored in the service priority definitions information 500.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A relay system for relaying first communication data between a client device and a host device, and second communication data between the host device and a third device different from the client device in response to a request from the client device in the first communication data, the relay system comprising;
   a storage unit; and
   a controller; wherein
   the controller performs processing of:
   monitoring the second communication data,
   acquiring, from the storage unit, a priority associated with a respective protocol in the second communication data,
   setting the priority, as a priority of communication data that is returned to the client device from the host device in the first communication data, and
   transmitting the communication data to the client device as a destination, wherein the storage unit comprises:
   an inward coupling management table for storing information to specify the first communication data;
   an outward coupling management table for storing information to specify the second communication data; and
   a service priority definition table for storing the priority associated with the protocol used in the second communication data; wherein,
   the inward coupling management table comprises a coupling source field, a coupling destination field, and an entry validity period field; wherein,
   the coupling source field comprises:
   an IP address field for storing an IP address of the client device as a coupling source; and
   a port number field for storing a port number of the client device as a coupling source; and
   the coupling destination field comprises;
   an IP address field for storing an IP address of the host device as a coupling destination; and
   a port number field for storing a port number of the host device as a coupling destination;
   the outward coupling management table comprises a coupling source field, a coupling destination field, a delivery priority field for storing a value indicating a priority when communication data is transferred to the client device from the host device, and an entry validity period field, wherein,
   the coupling source field comprises;
   an IP address field for storing an IP address of the host device as a coupling source; and
   a port number field for storing a port number of the host device as a coupling source; and
   the coupling destination field comprises;
   an IP address field for storing an IP address of the third device as a coupling destination; and
   a port number field for storing a port number of the third device as a coupling destination; and
   the service priority definition table comprises a port number field for storing a value to specify a port number of a coupling destination to perform the second communication and a delivery priority field for storing a value to specify a priority in a communication using the port number specified in the port number field, and
   the controller further performs processing of:
   determining, upon receipt of communication data, whether the communication data is the first communication data based on source IP address, destination IP address, source port number and destination port number thereof,
   if the communication data is the first communication data, generating a new entry in the inward coupling management table, storing an IP address and a port number of the client device as a coupling source in the IP address field and the port number field of the coupling source field of the entry, storing an IP address and a port number of the host device as a coupling destination in the IP address field and the port number field of the coupling destination field of the entry, and storing a value to specify a predetermined validity period in the entry validity period field of the entry, if communication data is not the first communication data, determining whether the communication data is the second communication data based on source IP address, destination IP address, source port number and destination port number thereof, if the communication data is the second communication data from the host device to the third device, generating a new entry in the outward coupling management table, storing a source IP address and a source port number of the communication data in the IP address field and the port number field of the coupling source field of the entry, storing a destination IP address and a destination port number of the communication data in the IP address field and the port number field of the coupling destination field of the entry, storing values to specify a predetermined validity period in the entry validity period field of the entry, searching the service priority definition table by using a destination port number of the communication data as a search key, storing a value stored in the delivery priority field of the matched entry to the delivery priority field of the entry in the outward coupling management table, and if the communication data is the first communication data from the host device to the client device, changing a priority of the communication data to a priority specified by the value.

2. The relay system according to claim 1, wherein, in the priority definition information, a priority of a protocol used in real-time communication is higher than a priority of another protocol.

3. The relay system according to claim 1, wherein:
the client device is a thin-client device,
the host device is a thin-client host server device,
the third device is a non-thin-client based device,
the first communication and the transmitting of the communication data, are each a thin-client communication that the thin-client host server device performs with the thin-client device,
the second communication is a non-thin-client based communication performed with the non-thin-client based device, and
wherein the priority of the non-thin-client based communication performed with the non-thin-client based device, is set by the setting operation, as the priority of the communication data transmitted as the thin-client communication.

4. A non-transitory computer-readable medium embodying a program that makes a computer function as a relay system for relaying first communication data between a client device and a host device, and second communication data between the host device and a third device different from the client device in response to a request from the client device in the first communication data, wherein the computer functions as:
a storage unit; and
a controller; wherein
the controller performs processing of:
monitoring the second communication data,
acquiring, from the storage unit, a priority associated with a respective protocol in the second communication data,
setting the priority, as a priority of communication data that is returned to the client device from the host device in the first communication data, and transmitting the communication data to the client device as a destination,
wherein the storage unit comprises:
an inward coupling management table for storing information to specify the first communication data;
an outward coupling management table for storing information to specify the second communication data; and
a service priority definition table for storing the priority associated with the protocol used in the second communication data; wherein,
the inward coupling management table comprises a coupling source field, a coupling destination field, and an entry validity period field; wherein,
the coupling source field comprises:
an IP address field for storing an IP address of the client device as a coupling source; and
a port number field for storing a port number of the client device as a coupling source; and
the coupling destination field comprises;
an IP address field for storing an IP address of the host device as a coupling destination; and
a port number field for storing a port number of the host device as a coupling destination;
the outward coupling management table comprises a coupling source field, a coupling destination field, a delivery priority field for storing a value indicating a priority when communication data is transferred to the client device from the host device, and an entry validity period field, wherein,
the coupling source field comprises;
an IP address field for storing an IP address of the host device as a coupling source; and
a port number field for storing a port number of the host device as a coupling source; and
the coupling destination field comprises;
an IP address field for storing an IP address of the third device as a coupling destination; and
a port number field for storing a port number of the third device as a coupling destination; and
the service priority definition table comprises a port number field for storing a value to specify a port number of a coupling destination to perform the second communication and a delivery priority field for storing a value to specify a priority in a communication using the port number specified in the port number field, and
the controller further performs processing of:
determining, upon receipt of communication data, whether the communication data is the first communication data based on source IP address, destination IP address, source port number and destination port number thereof,
if the communication data is the first communication data, generating a new entry in the inward coupling management table, storing an IP address and a port number of the client device as a coupling source in the IP address field and the port number field of the coupling source field of the entry, storing an IP address and a port number of the host device as a coupling destination in the IP address field and the port number field of the coupling destination field of the entry, and storing a value to specify a predetermined validity period in the entry validity period field of the entry,
if communication data is not the first communication data, determining whether the communication data is the second communication data based on source IP address, destination IP address, source port number and destination port number thereof,
if the communication data is the second communication data from the host device to the third device, generating a new entry in the outward coupling management table, storing a source IP address and a source port number of the communication data in the IP address field and the port number field of the coupling source field of the entry, storing a destination IP address and a destination port number of the communication data in the IP address field and the port number field of the coupling destination field of the entry, storing values to specify a predetermined validity period in the entry validity period field of the entry, searching the service priority definition table by using a destination port number of the communication data as a search key, storing a value stored in the delivery priority field of the matched entry to the delivery priority field of the entry in the outward coupling management table, and if the communication data is the first communication data from the host device to the client device, changing a priority of the communication data to a priority specified by the value.

5. The non-transitory medium according to claim 4, wherein, in the priority definition information, a priority of a protocol used in real-time communication is higher than a priority of another protocol.

6. A relay method in a relay system for relaying first communication data between a client device and a host device, and second communication data between the host device and a third device different from the client device in response to a request from the client device in the first communication data, wherein the system comprises:

a storage unit; and
a controller; wherein
the controller performs processing of:
monitoring the second communication data,
acquiring, from the storage unit, a priority associated with a respective protocol in the second communication data,
setting the priority, as a priority of communication data that is returned to the client device from the host device in the first communication data, and
transmitting the communication data to the client device as a destination,
wherein the storage unit comprises:
an inward coupling management table for storing information to specify the first communication data;
an outward coupling management table for storing information to specify the second communication data; and
a service priority definition table for storing the priority associated with the protocol used in the second communication data; wherein,
the inward coupling management table comprises a coupling source field, a coupling destination field, and an entry validity period field; wherein,
the coupling source field comprises:
an IP address field for storing an IP address of the client device as a coupling source; and
a port number field for storing a port number of the client device as a coupling source; and
the coupling destination field comprises;
an IP address field for storing an IP address of the host device as a coupling destination; and
a port number field for storing a port number of the host device as a coupling destination;
the outward coupling management table comprises a coupling source field, a coupling destination field, a delivery priority field for storing a value indicating a priority when communication data is transferred to the client device from the host device and an entry validity period field, wherein, the coupling source field comprises;
an IP address field for storing an IP address of the host device as a coupling source; and
a port number field for storing a port number of the host device as a coupling source; and
the coupling destination field comprises;
an IP address field for storing an IP address of the third device as a coupling destination; and
a port number field for storing a port number of the third device as a coupling destination; and
the service priority definition table comprises a port number field for storing a value to specify a port number of a coupling destination to perform the second communication and a delivery priority field for storing a value to specify a priority in a communication using the port number specified in the port number field, and
the controller further performs processing of:
determining, upon receipt of communication data, whether the communication data is the first communication data based on source IP address, destination IP address, source port number and destination port number thereof,
if the communication data is the first communication data, generating a new entry in the inward coupling management table, storing an IP address and a port number of the client device as a coupling source in the IP address field and the port number field of the coupling source field of the entry, storing an IP address and a port number of the host device as a coupling destination in the IP address field and the port number field of the coupling destination field of the entry, and storing a value to specify a predetermined validity period in the entry validity period field of the entry,
if communication data is not the first communication data, determining whether the communication data is the second communication data based on Source IP address, destination IP address, source port number and destination port number thereof,
if the communication data is the second communication data from the host device to the third device, generating a new entry in the outward coupling management table, storing a source IP address and a source port number of the communication data in the IP address field and the port number field of the coupling source field of the entry, storing a destination IP address and a destination port number of the communication data in the IP address field and the port number field of the coupling destination field of the entry, storing values to specify a predetermined validity period in the entry validity period field of the entry, searching the service priority definition table by using a destination port number of the communication data as a search key, storing a value stored in the delivery priority field of the matched entry to the delivery priority field of the entry in the outward coupling management table, and
if the communication data is the first communication data from the host device to the client device, changing a priority of the communication data to a priority specified by the value.

7. The relay method according to claim 6, wherein, in the priority definition information, a priority of a protocol used in real-time communication is higher than a priority of another protocol.

* * * * *